United States Patent [19]

Parks, Jr.

[11] 4,204,789

[45] May 27, 1980

[54] PASS THROUGH HAY BALE RETRIEVER

[76] Inventor: Frank Parks, Jr., Rte. 1, Box 57, Henryetta, Okla. 74437

[21] Appl. No.: 890,793

[22] Filed: Mar. 27, 1978

Related U.S. Application Data

[63] Continuation of Ser. No. 736,999, Nov. 29, 1976, abandoned.

[51] Int. Cl.² .............................................. B60P 1/38
[52] U.S. Cl. ................................... 414/24.5; 414/459
[58] Field of Search ............................... 214/390–392, 214/394, 505, 1 HH; 280/43, 17, 43.23

[56] References Cited

U.S. PATENT DOCUMENTS

| | | | |
|---|---|---|---|
| 1,244,783 | 10/1917 | Ruckes | 214/392 |
| 2,748,963 | 6/1956 | Torrence | 214/392 |
| 3,012,682 | 12/1961 | Williamson | 214/506 |
| 3,019,926 | 2/1962 | Christenson | 214/392 |
| 3,045,848 | 7/1962 | Christenson et al. | 214/392 |
| 3,866,935 | 2/1975 | Nelson | 214/505 |
| 4,058,183 | 11/1977 | Kröger | 214/392 |

FOREIGN PATENT DOCUMENTS 1278053 10/1961 France ...................................... 214/390
1264793 2/1972 United Kingdom ...................... 214/390

*Primary Examiner*—Robert G. Sheridan
*Assistant Examiner*—Lawrence E. Williams
*Attorney, Agent, or Firm*—Head & Johnson

[57] ABSTRACT

A pass through forklift-type vehicle for picking up large cylindrical or round bales of hay while the vehicle is moving, and discharging the bales at a preselected location while the vehicle is moving. The vehicle comprises a frame having a longitudinally extending open-ended tunnel therein and a pair of spaced mutually parallel lifting rails secured longitudinally in the tunnel and extending beyond both ends thereof. Each rail is operably connected with a respective pair of vehicle wheels whereby the rails and housing may be alternately raised to a position adjacent the surface of the ground and elevated to a position spaced above the ground. In the lowered position of the rails, the rails may be utilized for engaging the opposite sides of a hay bale, and the rails and hay bale engaged thereby may be simultaneously raised for supporting the bale in an elevated position as the vehicle moves across the surface of the ground.

2 Claims, 11 Drawing Figures

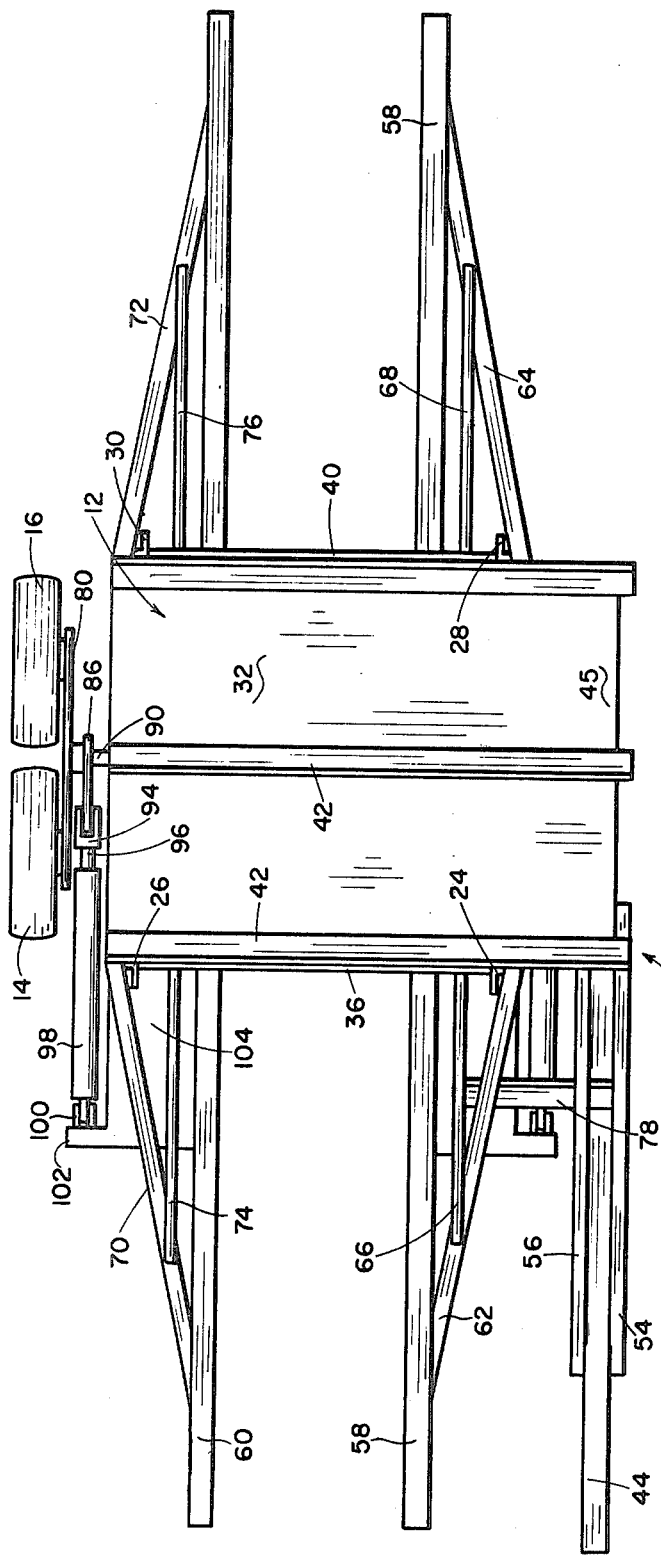
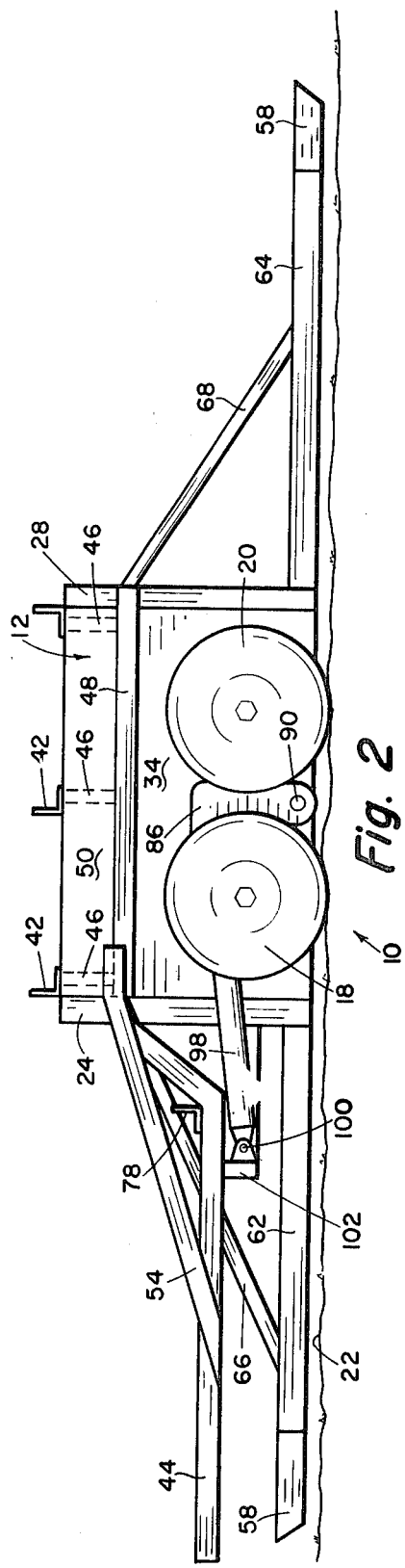

PASS THROUGH HAY BALE RETRIEVER

This is a continuation of application Ser. No. 736,999, filed Nov. 29, 1976, now abandoned.

BACKGROUND OF THE INVENTION

1. Field of the Invention

This invention relates to improvements in forklift-type vehicles, and more particularly, to a pass-through type forklift vehicle particularly designed and constructed for facilitating the retrieval of cylindrical or round hay bales and discharging of said bales in a preselected location.

2. Description of the Prior Art

In recent years, it has become commonplace to bind bales of hay in circular or cylindrical bales through the use of automated hay baling equipment. These cylindrical or circular hay bales are normally left in the field by the baling equipment and must be picked up later for movement to the desired storage site, or the like. The bales are usually relatively large and thus are heavy, weighing about 800 pounds each, and are difficult to handle by the presently available conventional means. The problem is accentuated today in that it is frequently difficult and expensive to obtain adequate manpower for the accomplishment of such tasks.

SUMMARY OF THE INVENTION

The present invention contemplates a novel drive-through or pass-over type forklift vehicle which has been particularly designed and constructed for facilitating the retrieval of large cylindrical hay bales from the scattered position on the field and delivering the retrieved bales for discharge at a preselected accumulation or storage site. The novel device is a four-wheeled towed vehicle having a forwardly extending offset tongue member adapted for attachment in any suitable manner to the lift device of a usual farm vehicle, such as a tractor or the like, whereby the device may be towed behind the farm vehicle. The device of the invention comprises a housing or main frame structure having a longitudinally extending tunnel therein with a pair of spaced mutually parallel lifting rails extending through the tunnel and having the opposite ends thereof extending well beyond the ends of the tunnel. Each rail is connected with a respective pair of wheels by a suitable linkage assembly whereby the rails may be selectively lowered to a position substantially adjacent the surface of the ground or raised to a position spaced above the surface of the ground. A hydraulic cylinder 20 is operably connected with each linkage assembly and also operably connected with the usual or normal lifting power of the farm towing vehicle whereby the cylinders may be selectively actuated by the driver or operator of the farm vehicle for alternately raising and lowering the rails.

The driver of the towing vehicle drives along the field wherein the bales of hay are disposed, and the forklift-type towed vehicle is moved along the course of the bales in such a manner that the tunnel is in substantial alignment with the longitudinal dimension of the bales, and the main frame or housing portion of the towed vehicle may be moved into a position straddling the bale to be retrieved. As the towed vehicle is moved into the straddling position, the rails are in the lowered position thereof, whereby the lowered rails engage the opposite sides of the bale for picking up the bale during the continued forward movement of the vehicle. The rails may then be elevated for lifting the engaged bale and storing the bale on the rails in an elevated position as the towed vehicle is moved into position for the retrieval of a second or additional bales. The process may be repeated for retrieving a plurality of bales. The bales are picked up in succession as the vehicle continually moves in a forward direction, and each bale being retrieved engages the previous bale for moving all the retrieved bales along the rails in a direction toward and through the tunnel. The bales are supported on the rails until the full capacity of the device is reached, at which time the towing vehicle may be driven to a place of discharge for the bales, and the rails may be lowered, and the device or towed vehicle pulled away from the bales, leaving the bales disposed on the surface of the ground at the storage area.

BRIEF DESCRIPTION OF THE DRAWINGS

FIG. 1 is a plan view of a hay bale retriever apparatus embodying the invention.

FIG. 2 is a side elevational view of a hay bale retriever apparatus and illustrated in the bale retrieving or discharging position.

DESCRIPTION OF THE PREFERRRED EMBODIMENT

Figure 3:
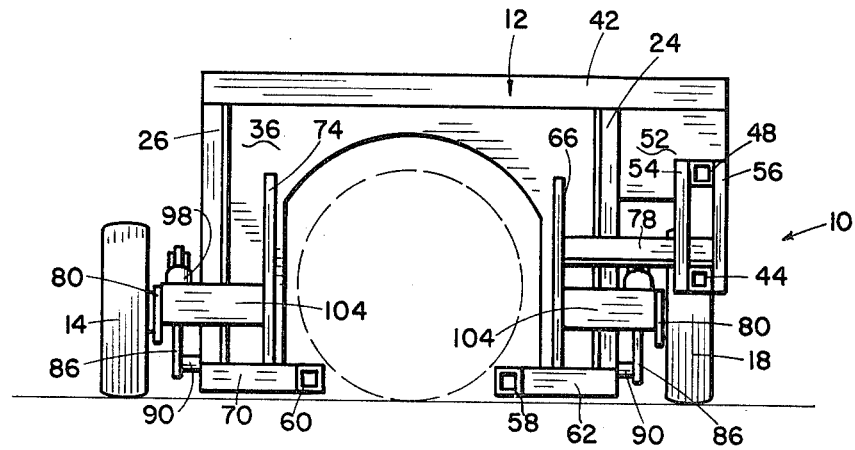
FIG. 3 is a rear elevational view of hay bale retriever apparatus embodying the invention illustrated in the retrieving or discharging position and having a hay bale indicated in broken lines.

Referring to the drawings in detail, and particularly FIGS. 1 through 4, reference character 10 generally indicates a hay bale retrieving apparatus comprising a main frame or housing 12 mounted between a first pair of substantially co-planar wheels 14 and 16 and a second pair of substantially co-planar wheels 18 and 20 and suitably supported thereby for movement across the surface of the ground 22 as will be hereinafter set forth. The frame or housing 12 may be of any suitable construction; and as depicted herein, it comprises a first pair of oppositely disposed spaced vertical angle members or support posts 24 and 26 and a second pair of similar vertical angle members or support posts 28 and 30 disposed in spaced substantially aligned relation thereto for forming the corners of the housing 12. It may be preferable to include a third pair of vertical support posts (not shown) interposed substantially centrally between the first and second pairs of support posts for strengthening of the housing 12. A top plate 32 is welded or otherwise secured between the top ends of the support posts 24, 26, 28 and 30 to provide a cover for the housing 12, and a pair of oppositely disposed side plates 34 (only one of which is shown in FIG. 2) are welded or otherwise secured between the outwardly exposed or laterally disposed edges of the support posts for providing side covers for the housing 12.

Figure 4:
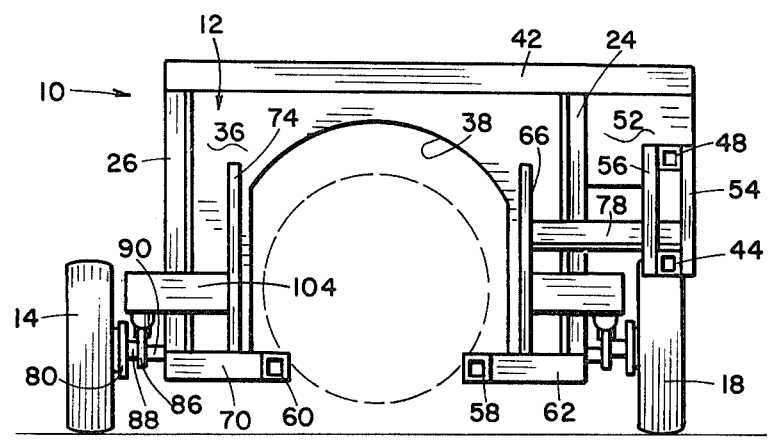
FIG. 4 is a view similar to FIG. 3 illustrating the raised or hay bale supporting position.

A front plate 36 is welded or otherwise secured between the support posts 24 and 26 and is provided with a centrally disposed recess 38 therein preferably of a substantially arch-shaped configuration having the lower end thereof open as particularly shown in FIGS. 3 and 4. a back plate 40 is similarly secured between the support posts 28 and 30 and is provided with a recess (not shown) therein substantially identical to the recess 38 and in substantial alignment therewith, thus forming a tunnel shaped longitudinally extending passageway through the housing 12. In addition, it may be preferable to secure a centrally disposed brace plate (not shown) similar to the plates 36 and 40 between the central support posts (not shown) for additional strength for the housing 12. In addition, a plurality of cross-brace members 42 are welded or otherwise secured across the upper surface of the cover plate 32 for further strengthening thereof. It is preferable to provide three of the cross-brace members 42, as shown in the drawings, but not limited thereto.

Considering the left-hand side of the apparatus 10 as shown in FIGS. 1, 2, and 7 through 11 as being the leading or forward end thereof, the left-hand side of the housing 12 is extending outwardly for facilitating the mounting of a tongue member 44 on the apparatus 10. The side extension may be of any suitable construction, and as shown herein, comprises an extension of the cross members 42 beyond the outer limits of the sidewall 34, whereby a secondary cover plate 45 may be welded to the lower legs thereof. Suitable spacer rods 46 may be welded or otherwise secured to the outer end of each of the cross members 42 and spaced from the sidewall 34 and extend downwardly therefrom and support a longitudinally extending brace member or bar 48 which may be welded or otherwise secured to the lower ends of the spacers 46, as particularly shown in FIG. 2. If desired, a suitable side plate 50 may be secured between the secondary cover member 45 and the bar 48, and a suitable front plate 52 may be secured between the wall 34 and side plate 50. In addition, a rear plate (not shown) similar to the plate 52 may be provided for the opposite end of the side extension.

The tongue 44 is rigidly secured between a pair of angularly disposed spaced brace members 54 and 56 in any suitable manner, such as by welding, and the brace members 54 and 56 are in turn rigidly secured to the forward end portion of the bar 48. In this manner, the tongue 44 is secured to the housing 12 offset from the central longitudinal axis thereof and extends forwardly therefrom a sufficient distance for connection with the usual lifting device (not shown) of any suitable farm vehicle (not shown) whereby the apparatus 10 may be towed behind the farm vehicle.

A pair of substantially identical, mutually parallel, spaced rails 58 and 60 extend through the housing 12 in the proximity of the tunnel opening thereof, and are rigidly secured to the housing 12 for simultaneous movement therebetween. As shown herein, an angularly disposed brace member 62 is welded or otherwise rigidly secured between the rail 58 and the support post 24 for securing one end of the rail 58 to the housing 12, and a second similarly angularly disposed brace member 64 is welded or otherwise rigidly secured between the rail 58 and the support post 28 for securing the rear end of the rail 58 to the housing 12. In addition, a vertically angular brace member 66 is welded, or the like, between the brace member 62 and the front plate 36, and a similar vertically angular brace member 68 is welded or the like between the brace member 64 and the rear plate 40, thus further strengthening the connection between the rail 58 and the housing 12. The rail 60 is oppositely disposed from the rail 58, and an angular brace member 70, similar to the member 62, is welded or the like, between the rail 60 and the vertical support post 26 for securing the forward end of the rail 60 to the housing 12. An angular brace member 72 similar to the brace 64 is welded between the rail 60 and the support post 30 for securing the rear end of the rail 60 to the housing 12. Additionally, a support brace 74 similar to the brace 66 is welded between the brace 70 and the front plate 36, and a support brace 76 is welded between the brace 72 and the rear plate 40 for additional strengthening of the connection between the rail 60 and the housing 12.

For additional strengthening, an angle member 78 is rigidly secured between the brace 66 and the tongue 44 for further strengthening of the overall structure of the apparatus 10 for a purpose as will be hereinafter set forth. It is to be noted that bracing of the overall structure is important in the light of the weight and size of the hay bales being handled thereby.

Each pair of wheels 14–16 and 18–20 are independently secured to the opposite sides of the housing 12 for supporting the housing from the surface 22 of the ground and for moving the housing and attached elements across the ground as will be hereinafter set forth. Each pair of wheels is substantially identical and arranged in substantially an identical manner, and accordingly, only one will be set forth in detailed description herein.

Figure 5:
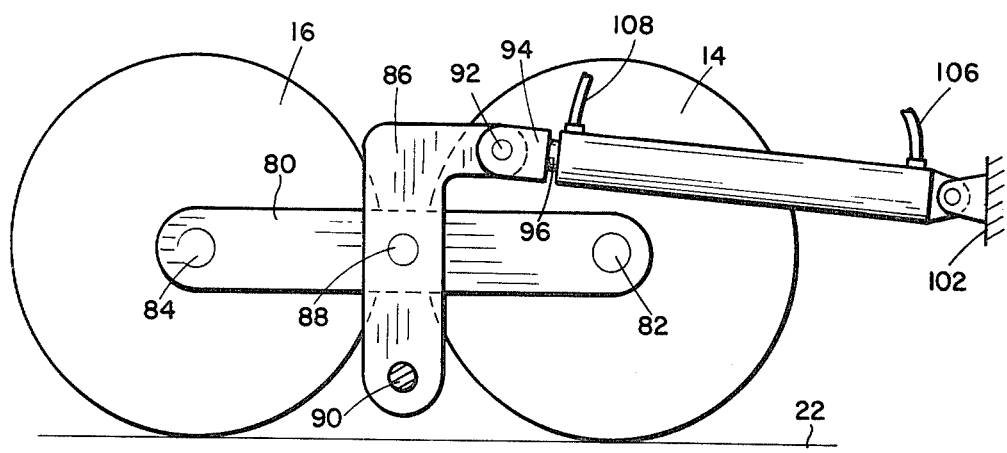
FIG. 5 is an enlarged side elevational view of a pair of wheels and associated linkage mechanism for raising and lowering the hay bales with respect to the surface of the ground, and illustrated in a lowered position.
Figure 6:
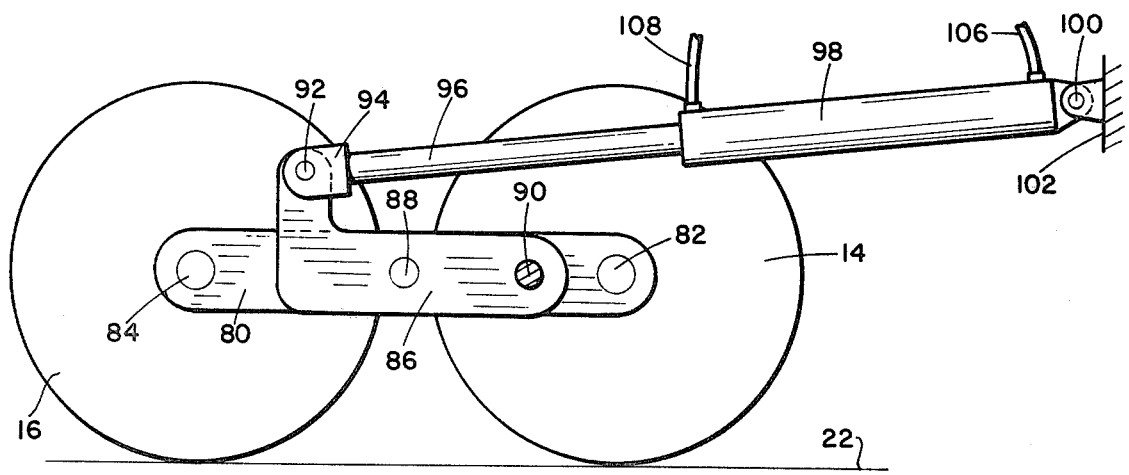
FIG. 6 is a view similar to FIG. 5 illustrating a raised position.

The wheels 14 and 16 are suitably journalled at the opposite ends of a link member 80 as indicated at 82 and 84 in FIGS. 5 and 6. A bell crank member 86 is pivotally secured at the center of the link 80 as shown at 88. One end of the bell crank 86 is connected with the housing 12 by a pin or rod member 90 whereby the housing 12 and associated elements are supported by the wheels 14–16 and 18–20. The opposite end of the bell crank 86 is pivotally secured at 92 to a suitable clevis member 94 provided on the outer end of the piston rod 96 of a suitable hydraulic cylinder 98 or the like. The outer end of the cylinder 98 is pivotally secured at 100 to a flange 102 of a structural element 104 which in turn is welded or otherwise rigidly secured to the front plate 36 at one side of the recess 38. The cylinder 98 is connected with a suitable source of hydraulic fluid (not shown) through suitable hydraulic lines 106 and 108 whereby fluid directed into the cylinder 98 through one of the lines, such as the line 106, will extend the piston rod 96 to the position shown in FIG. 6, and fluid directed into the cylinder 98 through the other line, such as the line 108, will contract the piston rod 96 within the cylinder 98 to the position shown in FIG. 5 for a purpose as will be hereinafter set forth.

Referring now to FIGS. 7 through 11, in operation the apparatus 10 may be connected with a suitable tow vehicle (not shown), such as a farm tractor, by securing the tongue member 44 to the tow vehicle in the usual or well-known manner whereby the apparatus 10 will be pulled along behind the tow vehicle, but will be offset with respect to the entire structure of the tow vehicle. Thus, the tunnel opening of the housing 12 will be unobstructed by any of the structure of the tow vehicle.

Figure 7:
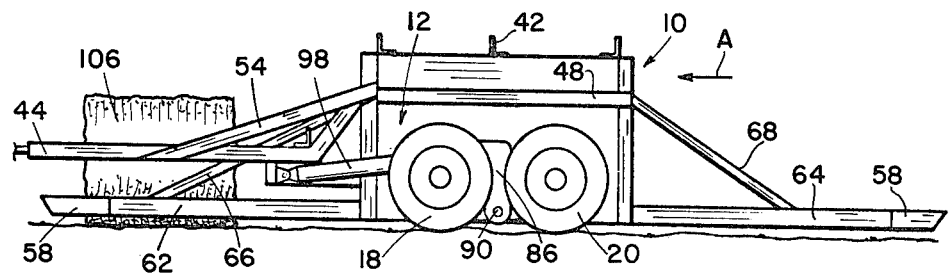
FIGS. 7 through 11 are side elevational views of a hay bale retrieving apparatus embodying the invention in operation through successive moves from the initial engagement with a first hay bale through the discharging of a load of hay bales from the apparatus.

As the tow vehicle moves forwardly, the apparatus 10 is pulled in the direction indicated by the arrow A in FIG. 7. The apparatus 10 is pulled along the surface 22 of the ground until the tunnel opening or recess opening 38 and associated recesses are in substantial longitudinal alignment with a hay bale lying on the ground and which is to be retrieved. The cylinders 98 are actuated in a manner for directing the hydraulic fluid thereto whereby the piston rod 94 is contracted within the cylinder 98. This rotates the bell crank 86 about the pivot 88 in a direction for moving the rod 90 into its lowermost position in the proximity of the surface of the ground, as shown in detail in FIG. 5. This action has the effect of raising the wheels 14–16 and 18–20 with respect to the main housing or frame 12; but since the wheels are held on the ground by gravity, the resultant effect with respect to the ground is that the main housing or frame 12 is lowered to a position whereby the rails 58 and 60 are disposed relatively close to the surface 22 as shown in FIG. 7. Thus, as the apparatus 10 continues its forward movement or movement in the direction of the arrow A, the rails 58 and 60 are moved alongside the bale 106 and engage the lower portion of the outer periphery thereof.

Figure 8:
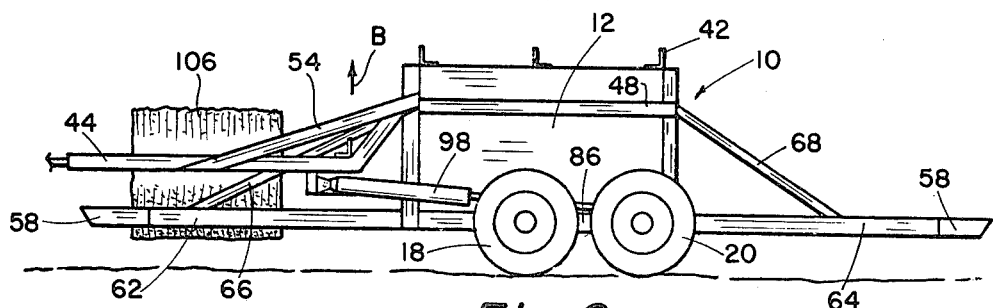

When the rails 58 and 60 are sufficiently engaged with the bale or disposed substantially surrounding the opposite sides of the bale 106, the cylinder 98 may be activated in a reverse manner whereby the piston rod 94 is extended to the position particularly shown in detail in FIG. 6. This action pivots the bell crank 86 in an opposite direction about the pivot point 88 whereby the rod 90 is moved into substantial alignment between the pivot connections or journals 82 and 84. This has the effect of lowering the wheels 14–16 and 18–20 with respect to the main frame or housing 12; but since the engagement between the wheels and the surface 22 precludes any downward movement of the wheels, the resultant effect is that the main frame or housing 12 is raised with respect to the ground 22. This elevates the rails 58 and 60 in the direction of the arrow B and to a greater distance between the rails and the surface of the ground. In this manner, the bale 106 is elevated from its position on the ground as shown in FIG. 8, and the entire apparatus 10 carrying the engaged or retrieved bale 106 therewith is raised to provide said elevated position for the bale.

Figure 9:
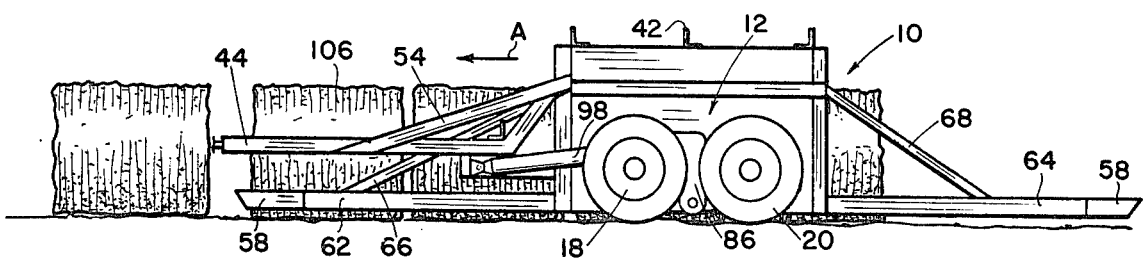
Figure 10:
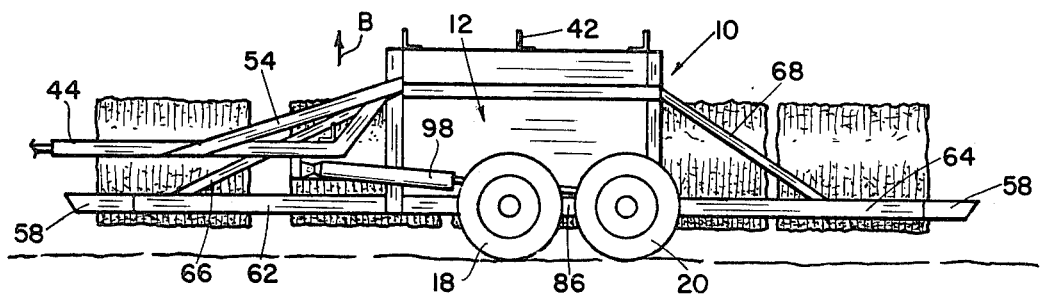
Figure 11:
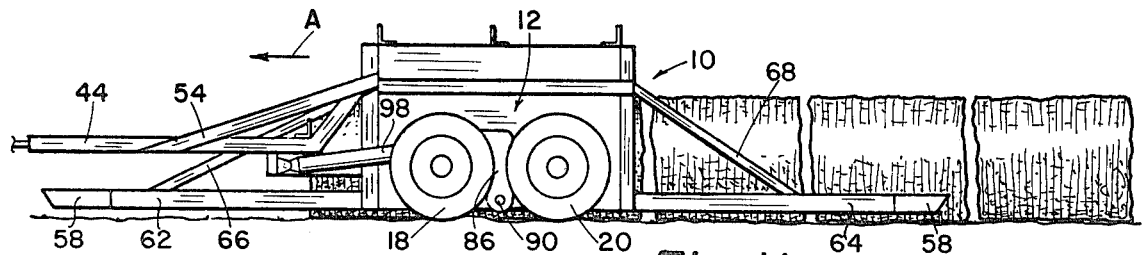

The operation as hereinbefore set forth is repeated until a sufficient number of the bales 106 have been engaged by the apparatus 10, as more particularly shown in FIGS. 9 and 10. With the engagement of each succeeding bale 106, the previously retrieved bales are pushed rearwardly along the rails 58 and 60 until the apparatus 10 has reached its capacity. As hereinbefore set forth, each bale 106 may weigh approximately 800 pounds; and as a consequence, the forces acting upon the apparatus 10 are extremely great. Thus, the bracing and cross bracing is quite important to the structure. The rails 58 and 60 are particularly designed for sufficient strength for lifting of the loads, and the housing 12 is reinforced for withstanding the stress placed thereon during operation of the apparatus 10. In addition, since most of the retrieving operations are accomplished during the continual forward movement of the apparatus 10, as the bales 106 are pushed rearwardly on the rails 58 and 60; and as the cylinder 98 is actuated for resulting in the raising of the position of the bales, the wheels 14–16 and 18–20 receive a force tending to push them rearward; and since this is the natural relationship of movement between the wheels and the main frame 12 during the forward movement of the apparatus 10, the inherent forces facilitate the overall operation of the apparatus.

When the apparatus 10 has been filled to capacity and it is desired to unload the retrieved bales 106 therefrom, or at any other time when it is desired to discharge the retrieved bales from the apparatus 10, the cylinder 98 may be actuated in the manner as hereinbefore set forth for lowering the rails 58 and 60 to the lowermost position thereof. In this position, all of the bales supported by the rails will be deposited against the surface 22 of the earth or ground, and the continued forward movement of the apparatus 10 will disengage the apparatus 10 from any engagement with the bales whereby the bales may be left in a relatively close accumulation for further retrieval of storge, as desired, and as well known.

From the foregoing, it will be apparent that the present invention provides a novel apparatus for the retrieval of a plurality of relatively heavy, large cylindrical or round hay bales normally scattered about a field. The novel apparatus comprises a main frame or housing having a tunnel-like opening extending longitudinally therethrough whereby the apparatus may be moved over the hay bales in a substantially straddling type action. A pair of oppositely disposed, substantially parallel rails are carried by the main frame and may be alternately lowered to a position substantially adjacent the surface of the ground for engaging the sides of the hay bales and raised to an elevated position for supporting the bales in a manner for transporting the collected or retrieved hay bales to a preselected site. When the bales are to be discharged from the apparatus, the rails may be moved to the lowermost position therefor whereby the bales are deposited on the surface of the ground and the apparatus may be towed longitudinally away from the deposited bales for discharge thereof from the apparatus. The novel hay bale retrieving device is simple and efficient in operation and economical and durable in construction.

Whereas the present invention has been described in particular relation to the drawings attached hereto, it should be understood that other and further modifications, apart from those shown or suggested herein may be made within the spirit and scope of this invention.

What is claimed is:

1. A pass through hay bale retriever comprising a relatively short main frame means having a centrally disposed substantially tunnel-shaped unobstructed recess extending longitudinally therethrough, rail means secured to the main frame means and extending longitudinally through and beyond each end of said tunnel-shaped recess through a distance at least equal to the length of one hay bale, wheel means operably secured to the main frame means in the proximity of the tunnel-shaped recess for supporting and transporting of the hay bale retriever across the surface of the ground, means operably connected between the wheel means and the main frame means whereby the rail means and main frame means may be alternately lowered and raised with respect to the surface of the ground through a substantially straight vertical path and including means for maintaining said rail means in a substantially horizontal position during raising and lowering thereof, said real means being disposed adjacent the opposite sides of the hay bale in the lowered position for an initial engagement therebetween, said rail means supporting said hay bale in an elevated position in the raised position for retrieving of the hay bale, and wherein the wheel means includes a first pair of substantially co-planar wheels disposed in relatively close relationship to one another and carried by a common link member which is secured to one side of the main frame means, and a second pair of substantially co-planar wheels disposed in substantially close relationship to one another and carried by a second common link member which is secured to the opposite side of the main frame means, said second pair of wheels being disposed in substantial axial alignment with said first pair of wheels, and wherein the raising and lowering means comprises bell crank means cooperably connected with each pair of wheels and pivotal between a first and second position, hydraulic cylinder means operably connected to one end of said bell crank means for pivoting thereof between said first and second positions, rod means connected between the opposite end of said bell crank means and the main frame means whereby actuation of the hydraulic cylinder for pivoting the bell crank to the first position results in a lowering of the main frame means with respect to the surface of the ground, and actuation of the hydraulic cylinder for pivoting of the bell crank to the second position results in elevating of the main frame means with respect to the surface of the ground.

2. A pass through hay bale retriever comprising a relatively short main frame means having a centrally disposed substantially tunnel-shaped unobstructed recess extending longitudinally therethrough, rail means secured to the main frame means and extending longitudinally through and beyond each end of said tunnel-shaped recess through a distance at least equal to the length of one hay bale, wheel means operably secured to the main frame means in the proximity of the tunnel-shaped recess for supporting and transporting of the hay bale retriever across the surface of the ground, means operably connected between the wheel means and the main frame means whereby the rail means and main frame means may be alternately lowered and raised with respect to the surface of the ground through a substantially straight vertical path and including means for maintaining said rail means in a substantially horizontal position during raising and lowering thereof, said rail means being disposed adjacent the opposite sides of the hay bale in the lowered position for an initial engagement therebetween, said rail means supporting said hay bale in an elevated position in the raised position for retrieving of the hay bale, and wherein the wheel means comprises a first pair of substantially co-planar wheels operably connected with one side of said main frame means, a second pair of substantially co-planar wheels operably connected with the opposite side of said main frame means and disposed in substantially axial alignment with each first pair of wheels, each of said first pair of wheels being journalled in the proximity of the opposite ends of a common link member, and each of said second pair of wheels being journalled in the proximity of the opposte ends of a second common link member, each of said link members being connected with the respective side of the main frame means by the raising and lowering means, and wherein the raising and lowering means comprises bell crank means pivotally secured to each link member and movable between first and second positions, hydraulic cylinder means connected between one end of the bell crank means and the main frame means, connection rod means connected between the opposite end of the bell crank means and the respective side of the main frame means, said cylinder means being operable for selectively moving the bell crank means to said first position for lowering the main frame means with respect to the surface of the ground and to said second position for raising the main frame means with respect to the surface of the ground.

* * * * *